Oct. 31, 1944.  C. MICHAELS  2,361,701
METHOD OF REPAIRING CRACKS IN METAL WALLS
Filed July 1, 1942
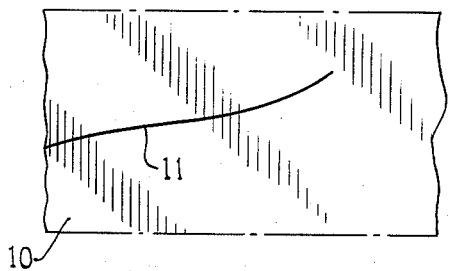
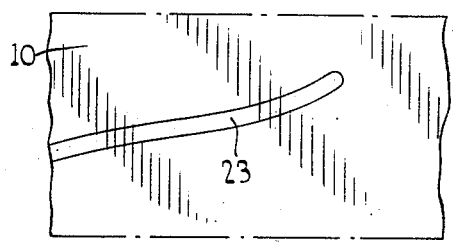
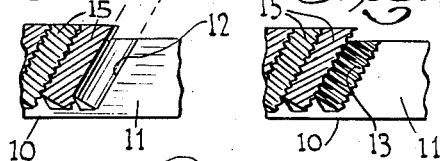
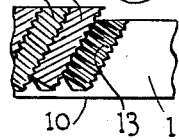
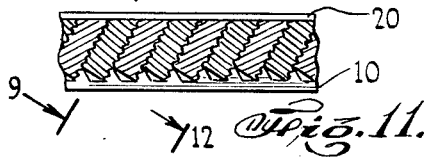
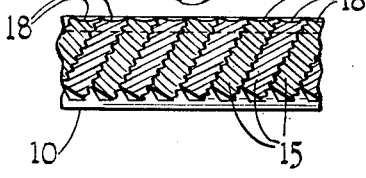
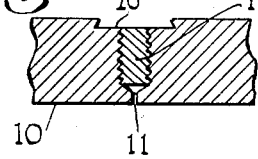
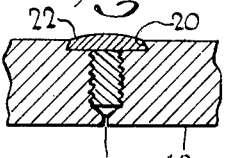
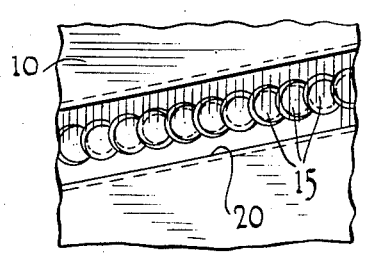
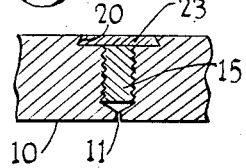
INVENTOR.
CHARLES MICHAELS
BY
J. B. Felshin
ATTORNEY Patented Oct. 31, 1944

2,361,701

UNITED STATES PATENT OFFICE 2,361,701

METHOD OF REPAIRING CRACKS IN METAL WALLS

Charles Michaels, Flushing, N. Y.

Application July 1, 1942, Serial No. 449,242

7 Claims. (Cl. 29—148)

This invention relates to repaired casting cracks and methods of making such repairs. It is particularly directed to a method for repairing heat cracks in cylinder blocks or heads for internal combustion engines, and the like cracks in metal structures.

An object of the present invention is to provide a method of the character described, consisting in stitching along the crack and welding the screws used in the stitching operation to each other and to the casting.

Yet a further object of this invention is to provide an improved process of the character described, in which the screws used in the stitching operation are set at an angle to the surface of the cracked wall being repaired, so as to increase the number of threads on the screws embedded within the wall, thereby permitting repair of even relatively thin cracked walls.

A still further object of this invention is to provide in a process of the character described, consisting in using weld metal which has substantially the same coefficient of expansion as the metal of which the cracked casting is made, and which weld metal nevertheless has a higher melting point than the metal of the casting, whereby said weld metal serves as heat insulation for the screws used in stitching the crack, and to prevent the screws from loosening.

Another object of this invention is to provide a highly improved process of the character described, which shall be economical to carry out, and which shall yet be practical and efficient to a high degree.

Other objects of this invention will in part be obvious and in part hereinafter pointed out.

The invention accordingly consists in the combination of steps, features of construction, combinations of elements, and arrangement of parts which will be exemplified in the method and construction hereinafter described, and of which the scope of application will be indicated in the following claims.

In the accompanying drawing, in which is shown one of the various possible illustrative embodiments of this invention, Fig. 1 is a top plan view of part of a casting formed with a crack;

Fig. 2 is a top plan view of the structure shown in Fig. 1, fully repaired;

Fig. 3 is an elevational longitudinal view through a crack illustrating a step in the method of repairing the crack;

Fig. 4 is a view similar to Fig. 3, but illustrating a further step in said improved method;

Fig. 5 is a view similar to Fig. 4, and illustrating a still further step;

Fig. 6 is a view similar to Fig. 5, and showing all the screws inserted and peened;

Fig. 7 is a view similar to Fig. 6 and showing the upper ends of the peened screws ground off and the upper ends of the screws again peened;

Fig. 8 is a view similar to Fig. 7, but showing the groove formed in the top of the casting along the line in the crack;

Fig. 9 is a cross-sectional view taken on line 9—9 of Fig. 8;

Fig. 10 is a top plan view of the structure shown in Fig. 9;

Fig. 11 is a cross-sectional view similar to Fig. 8, after the welding operation;

Fig. 12 is a cross-sectional view taken on line 12—12 of Fig. 11; and

Fig. 13 is a view similar to Fig. 12, but after the excess welded metal is ground down.

Referring now in detail to the drawing, 10 designates part of a casting such as an engine casing, and 11 designates a crack, such as a heat crack, which is often caused in engines, such as internal combustion for automobiles and trucks.

In accordance with the present invention, the cracked casting 10 is first stitched along the crack. To carry out this operation, there is first drilled an opening 12 at one end of the crack. The drilled opening is preferably at an angle as shown in Fig. 3. An angle of about 30 degrees to the vertical has been found practical. The drilled opening 12 preferably does not go entirely through the wall of the casing, although it may be drilled completely therethrough if desired.

The drilled hole 12 is then tapped as illustrated in Fig. 4. A screw 15 is then screwed into the tapped opening 13. Said screws may be made of malleable iron, soft steel or carbon steel, although soft steel or iron screws have been found most desirable.

The screw is preferably considerably longer than the tapped opening so that a portion of the screw projects above the upper surface of the casting wall 10. The upper end of the screw 15 is then cut off at a point about two threads above the upper surface of the casting wall. The next opening 12 is then drilled parallel to the last screw 15 but partially overlapping the same, so that a portion of the last screw is also drilled. The overlap is preferably equal to substantially the thickness of the thread of the screw 15. The operation is repeated until the entire length of the crack is drilled, tapped and has screws inserted therein.

The upper ends of the screws 15 are then peened as shown at 18, in Fig. 6 of the drawing, to tighten the threads. The upper ends of the screws are then preferably ground or otherwise removed to a height of about ½ a thread above the upper surface of the casting wall, as illustrated in Fig. 7. The upper ends of the screws are then again peened as illustrated at 19 in Fig. 7 to tighten the threads further down.

The upper ends of the screws and the top surface of the casting wall is then either ground, chiselled or milled out to form a groove 20 running along the crack. Groove 20 may be of dovetailed cross-section, as illustrated in Fig. 9 of the drawing, or of square cross-section, or any other suitable cross-section. The groove may be about 1/32 of an inch below the upper surface of the casting wall. The groove is preferably wider than the diameter of the screws, as is likewise illustrated in Fig. 9 of the drawing. The screws are centered relative to the groove.

The upper ends of the screws are then welded together preferably by arc welding. Nickel alloy electrodes are preferable, although steel or bronze welding alloys may be used. The welding metal should have a coefficient of expansion almost the same as that of cast iron, but yet have a higher melting point than cast iron, so that the welding metal filling the groove 20 will serve as an insulation for the screws 15. For this purpose, nickel alloy electrodes containing mostly nickel and smaller amounts of copper and iron have been found practical.

The welding metal will project above the upper surface of the casting wall, as illustrated at 22, in Fig. 12 of the drawing. The surplus or excess metal may then be grounded down to form a smooth surface 23, level with the surface of the casting, as shown in Fig. 13 of the drawing.

If the casting wall is heavy, the slot or groove 20 may be cut before drilling or inserting the screws, and in such case, the screws are chiselled or otherwise cut down to below the upper surface of the casting wall. Furthermore if the crack is away from the combustion chamber or any machined surfaces, the slot may be omitted and the exposed ends of the screws welded. If the slot is omitted a rough surface results, and therefore the slot can only be omitted where a rough surface does not matter.

I have found cracks repaired as described above, will not only seal the crack against water leakage from the water jacket, but will also seal against combustion pressures which may exceed 500 pounds per square inch. Furthermore, the weld metal aids in insulating the heat generated in the combustion chambers of internal combustion engine cylinders which heat may exceed 1000° F.

It will thus be seen that there is provided a device and method in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A method for repairing a crack in a wall, consisting in stitching along the crack with contacting screws, then cutting a groove in the upper surface of the wall along the crack wider than the screws, and then hot welding the stitched screws along the crack to fill the groove with welded metal.

2. A method of repairing a crack in a metal wall, consisting in drilling a hole at one end of the crack, at an inclination to the outer surface of said wall, tapping the drilled hole, inserting a screw in the tapped hole, drilling another hole parallel to the screw and overlapping the screw, tapping the last hole and inserting a screw therein, and repeating the operation substantially along the entire length of the crack, cutting off upper portions of the screws, and peening the exposed ends of the screws, cutting a groove along the crack and cutting down the upper ends of the screws to about the level of the bottom of the groove, and then hot welding the upper end of the screws within the groove, filling the groove with welded metal.

3. A method of repairing a crack in a metal wall, consisting in drilling a hole at one end of the crack, at an inclination to the outer surface of said wall, tapping the drilled hole, inserting a screw in the tapped hole, drilling another hole parallel to the screw and overlapping the screw, tapping the last hole and inserting a screw therein, and repeating the operation substantially along the entire length of the crack, cutting off upper portions of the screws, and peening the exposed ends of the screws, cutting a groove along the crack and cutting down the upper ends of the screws to about the level of the bottom of the groove, and then hot welding the upper end of the screws within the groove, filling the groove with welded metal, and then grinding away any excess welded metal that may project above the groove.

4. A method of repairing a crack in a casting, consisting in stitching along the crack with contacting, parallel screws disposed at an inclined angle to the exposed surface of the cracked casting, each screw having a groove receiving part of an adjacent screw, and with the screws extending through the major thickness of the casting wall, but not entirely through said wall, and using soft iron screws in the stitching operation, and forming a groove along the crack, and hot welding the ends of the screws within the groove.

5. A method of repairing a crack in a metal wall, consisting in drilling a hole at one end of the crack at an inclination to the wall, tapping the drilled hole, inserting the screw into the tapped hole, drilling another hole parallel to the screw in overlapped relation to the screw, tapping the last hole, inserting a screw therein, repeating the operation substantially along the entire length of the crack, cutting off upper portions of the screws to leave about two threads of the screws exposed above the surface of the wall, peening the exposed ends of the screws, then cutting off upper portions of the screws to a height of about half a thread above the surface of said wall, and again peening the ends of said screws.

6. A method of repairing a crack in a metal wall, consisting in drilling a hole at one end of the crack at an inclination to the wall, tapping the drilled hole, inserting the screw into the tapped hole, drilling another hole parallel to the screw in overlapped relation to the screw, tapping the last hole, inserting a screw therein, repeating the operation substantially along the entire length of the crack, cutting off upper portions of the screws to leave about two threads of the screws exposed above the surface of the wall, peening the exposed ends of the screws, then cutting off upper portions of the screws to a height of about half a thread above the surface of said wall, and again peening the ends of said screws, said holes being drilled substantially through said wall, but not entirely through said wall.

7. A method of repairing a crack in a metal wall, consisting in drilling a hole at one end of the crack at an inclination to the wall, tapping the drilled hole, inserting the screw into the tapped hole, drilling another hole parallel to the screw in overlapped relation to the screw, tapping the last hole, inserting a screw therein, repeating the operation substantially along the entire length of the crack, cutting off upper portions of the screws to leave about two threads of the screws exposed above the surface of the wall, peening the exposed ends of the screws, then cutting off upper portions of the screws to a height of about half a thread above the surface of said wall, and again peening the ends of said screws, said holes being drilled substantially through said wall, but not entirely through said wall, cutting a groove in the surface of said wall along the crack, together with the upper ends of the screws, and welding the upper ends of the screws by arc welding to fill the groove with welded metal.

CHARLES MICHAELS.